Patented Apr. 13, 1926.

1,581,030

UNITED STATES PATENT OFFICE.

STANLEY COCHRAN SMITH, OF LONDON, ENGLAND.

PROCESS OF FORMING SULPHITE OF LEAD.

No Drawing.   Application filed September 3, 1925.   Serial No. 54,335.

*To all whom it may concern:*

Be it known that I, STANLEY COCHRAN SMITH, a subject of the King of Great Britain, residing in London, England, have invented a certain new and useful Process of Forming Sulphite of Lead, of which the following is a specification.

In some processes it is convenient to win lead or to remove lead from ores, concentrates or other lead-containing materials, in the form of lead chloride, but this product has not a wide application and cannot readily be smelted to yield lead.

Lead sulphite is more easily smelted than lead chloride is, and I have found that the sulphite is sufficiently insoluble in alkali chloride solutions and in solutions of other chlorides to permit of its precipitation more readily than that of lead sulphate, leaving a liquor containing substantially no lead in solution.

According to this invention, lead chloride (which expression includes basic lead chlorides) dissolved or suspended in suitable form in water or in a solution of an alkali chloride, an alkaline earth chloride, magnesium chloride, ammonium chloride or other suitable chloride is treated with a sulphite or an acid sulphite whereby lead sulphite is precipitated.

Instead of adding a preformed sulphite to the solution or suspension of lead chloride there may be added a basic substance such as an oxide, hydroxide or carbonate of a metal, including ammonia, and sulphur dioxide may be passed into the liquid. Suitable oxides, hydroxides or carbonates are those which dissolve in water or in a solution of sulphur dioxide in water.

The chloride of lead, to be in suitable form for the purpose of the invention, should be in a fine state of subdivision. It is preferably prepared by finely grinding the crystalline salt, or by precipitating the chloride, for example by adding a hot strong solution thereof in brine to a large excess of cold water. It may also be obtained by decomposing a suitable double salt of lead chloride, with water, and, if the salt combined with the lead chloride is without adverse influence on the process, the double salt (e. g. chloride of lead and ammonium) may be used directly, in which case the chloride of lead is produced in situ. Crystalline lead chloride, such as is obtained by ordinary wet methods, may also be used, provided efficient mechanical agitation is employed. The finer the state of subdivision of the chloride the more rapidly the conversion proceeds and the less is the need for vigorous agitation, but mechanical agitation is advantageous in all cases.

A suitable sulphite solution for treating lead chloride may be made from an oxide or oxidized ore; for instance, roasted blende (i. e., zinc oxide formed by roasting zinc sulphide ores) may be leached with an aqueous solution of sulphur dioxide and separated from the insoluble residue; the clear solution may be treated with lead chloride in suspension.

The following examples illustrate the invention, the parts being by weight:—

*Example 1.*—50 parts of lead chloride, prepared by precipitation from brine as above described, are suspended in 250 parts of water containing 15.2 parts of precipitated magnesium carbonate. Sulphur dioxide, or gases containing sulphur dioxide, is passed through the mixture whilst the solids are kept in suspension by mechanical agitation with a Gabbett mixer; the passage of gas is continued for one hour at atmospheric temperature and one hour at the boiling point. The solids are separated from the liquor and are washed with a little water when they will be found to consist substantially of lead sulphite.

The liquor separated from the lead sulphite may be treated in any known manner for recovery of its useful constituents. In the systematic working of the process, however, this liquor may be used repeatedly in converting successive batches of chloride of lead into lead sulphite, portions of the liquor being withdrawn at intervals for recovery of the constituents, water containing magnesium carbonate being substituted for the portion withdrawn.

*Example 2.*—Chloride of lead is suspended in a solution of ammonia and a current of gases containing sulphur dioxide is passed through the mixture at a convenient temperature, the mixture being agitated in a suitable manner. The ratio of lead chloride to water should be such that the suspension can be handled mechanically, and the quantity of ammonia used should be at least equivalent to the lead chloride. An oxide, a hydroxide or a carbonate of a metal may be used instead of ammonia, as previously stated, the quantity being at least equivalent to the lead chloride.

The passage of the gases is continued until no further appreciable absorption occurs.

The lead sulphite is separated from the liquor and washed with water. The liquor is divided into two portions each of known weight, one of which (hereinafter referred to as the "nucleus liquor") is used in the treatment of another batch of chloride of lead, while the other (the "residual liquor") is withdrawn for the recovery of its constituents as aforesaid. To the nucleus liquor is added (1) a quantity of water equal to that contained in the residual liquor, (2) a quantity of ammonia (or oxide or hydroxide or carbonate of a metal) equal to or slightly in excess of that contained (as combined or free ammonia or oxide or hydroxide) in the residual liquor, and (3) a quantity of lead chloride equivalent to or slightly less than the ammonium chloride (or metallic chloride) contained in the residual liquor, 278 parts of lead chloride being equivalent to 107 parts of ammonium chloride.

Sulphur dioxide gases are now passed through this mixture under the same conditions as before, the concentration of the sulphur dioxide in the gases also being the same as before. The lead sulphite produced is separated from the liquor, the latter is divided into "nucleus liquor" and "residual liquor", and the sequence of operations is repeated as often as desired.

I do not limit myself to the addition of the reagents in the order above described; thus the whole or a part of the sulphur dioxide may be absorbed by the ammonia (or oxide or hydroxide or carbonate of a metal) prior to the introduction of the chloride of lead.

The process may be conducted on the counter-current principle, that is to say, the fresh chloride of lead may be subjected to the preliminary stages of the treatment with sulphur dioxide in liquor which has already been used in the treatment of partly sulphited lead chloride and has the lowest concentration of free ammonia, and the partly or almost completely sulphited solid before leaving the process is subjected to the action of the liquor containing the highest concentration of free ammonia.

By my process I am able to obtain relatively concentrated solutions of ammonium chloride or metal chloride which may be used in a lead extraction process and also, in the case of ammonium chloride, from which the ammonia may be economically recovered by the use of lime or other alkali with a low consumption of fuel. The solution of ammonium chloride may be so concentrated that, on cooling, ammonium chloride crystallizes; the liquor from which the solid ammonium chloride has been separated may then be used as the medium in which a further quantity of lead chloride is suspended and sulphited in another cycle of operations. It will be seen that my process provides a method for the recovery of ammonium chloride which involves no concentration or evaporation of ammonium chloride liquors.

Processes are known for the treatment of ores, concentrates, or metallurgical residues containing lead whereby the lead is obtained in the form of lead chloride. According to the present invention lead chloride is thus obtained and is then converted into lead sulphite as hereinbefore described, the chlorine of the lead chloride being recovered in the form of ammonium chloride, calcium chloride or the like which may, if desired, be used in obtaining further quantities of lead chloride.

In some cases zinc sulphite is particularly useful in carrying out my process.

*Example 3.*—In many metallurgical operations zinc sulphide ores containing lead compounds are roasted to convert the zinc sulphide mainly into zinc oxide, leaving behind a residue containing lead and silver sulphates, if any silver were present in the original ore. I make from the roasted ore a solution of zinc sulphite by suspending the roasted ore in water through which gases containing sulphur dioxide are passed; the liquor is separated from the residue consisting of gangue mixed with lead and silver sulphates. This residue is treated with a hot chloride solution which may contain a little acid, the liquor is separated from the solids and any silver in the liquor is removed in known manner; on cooling, the solution lead chloride separates and is removed in any convenient manner. The lead chloride is then agitated with the solution of zinc sulphite obtained as previously described. Should the quantity of zinc sulphite present in the solution be less than equivalent to the lead chloride the deficiency may be made good by suspending the necessary quantity of zinc oxide or carbonate in the liquor and passing through the liquor gases containing sulphur dioxide. There is thus obtained lead sulphite which may contain a little lead sulphate and a solution of zinc chloride which, after removal of the lead sulphite, may be utilized in any known manner.

*Example 4.*—Processes are known of winning lead which involve the heating of a lead sulphide ore with zinc chloride or in a melt containing zinc chloride, whereby lead chloride and zinc sulphide are formed. I apply my invention to such processes by separating the lead chloride and zinc sulphide from the melt in known manner and roasting the zinc sulphide to zinc oxide.

The lead chloride is converted into suitable form as hereinbefore described and suspended in water together with the equivalent quantity of the zinc oxide. Gases containing sulphur dioxide are passed through the liquor to obtain lead sulphite, which may contain a little lead sulphate, and a solution of zinc chloride. The lead sulphite is removed from the solution and the latter is evaporated to obtain solid zinc chloride for use in working up a further batch of the ore.

With reference to basic lead chloride which, as already stated, is herein covered by the term lead chloride, it is to be understood that while those basic chlorides which partake of the nature of a mixture of lead hydroxide and lead chloride give good results, there are others which do not give satisfactory results. However, an experiment in each case will readily show whether any particular basic chloride is capable of satisfactory conversion.

I am aware of the process of producing solutions of zinc by reaction between a solution of the chloride of a metal whose sulphite is relatively insoluble, and zinc sulphite, and I do not claim this general reaction.

Having thus described the nature of the said invention and the best means I know of carrying the same into practical effect, I claim:—

A process of forming sulphite of lead from ores, concentrates or residues containing lead by first converting the lead thereof into lead chloride, separating such lead chloride from the other dissolved constituents, suspending the lead chloride in an aqueous liquid containing a basic compound of a metal which forms a soluble sulphite, and a chloride of such metal, agitating the suspension and passing sulphur dioxide through it until the lead of the lead chloride has been converted into lead sulphite.

In testimony whereof I have signed my name to this specification.

STANLEY COCHRAN SMITH.